Aug. 21, 1956  R. BEATTIE  2,760,184
SYSTEM FOR DETECTING SOLIDS IN GASEOUS STREAMS
Filed Aug. 22, 1952
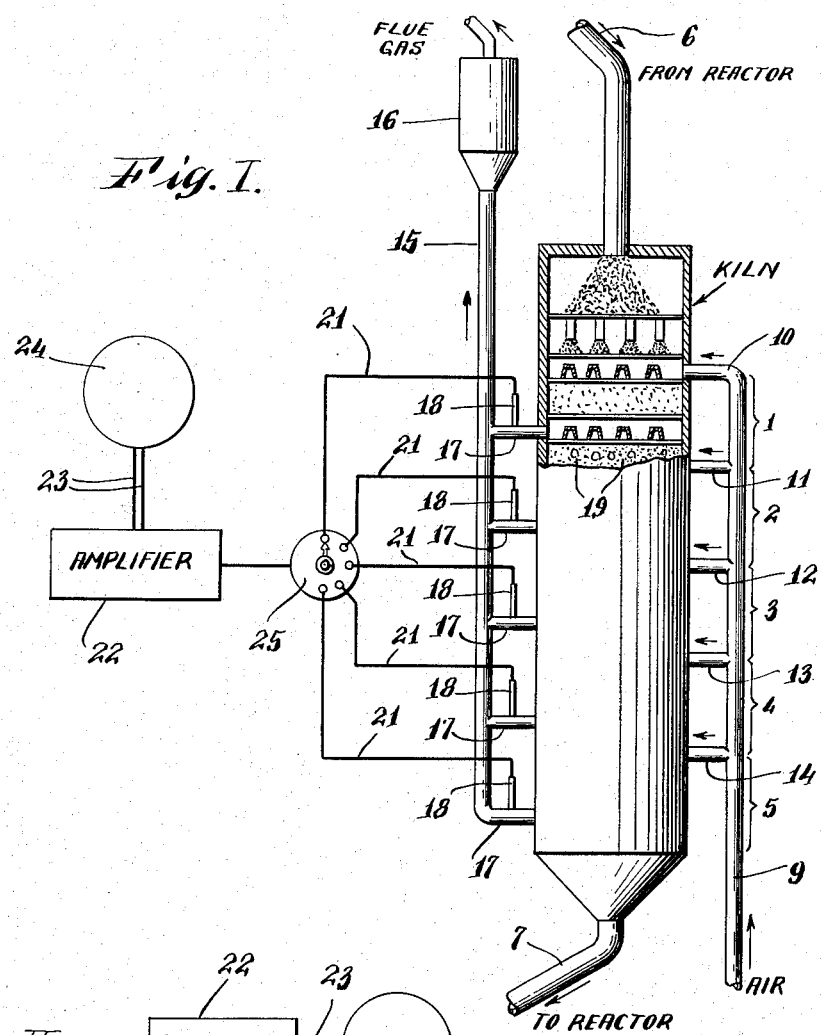
Fig. I.
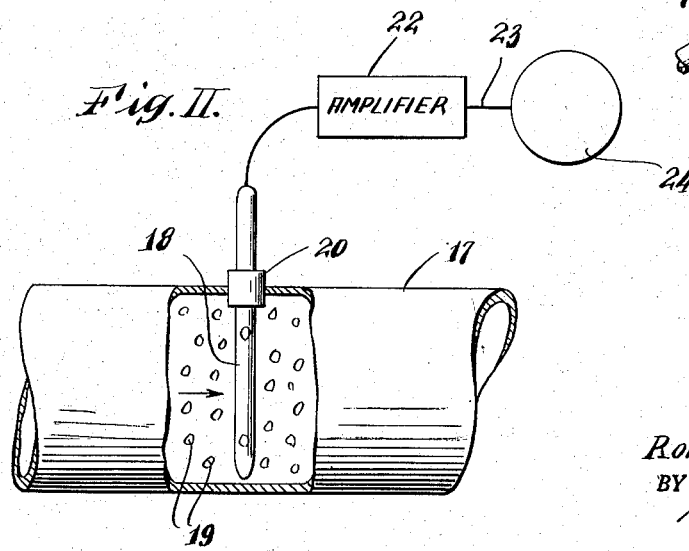
Fig. II.
INVENTOR.
Robert Beattie
BY Harry T. Hutton
ATTORNEY.

United States Patent Office 2,760,184
Patented Aug. 21, 1956

2,760,184

SYSTEM FOR DETECTING SOLIDS IN GASEOUS STREAMS

Robert Beattie, Plainfield, N. J., assignor to Tidewater Oil Company, a corporation of Delaware Application August 22, 1952, Serial No. 305,726

3 Claims. (Cl. 340—239)

Various industries employ processes involving the flow of gaseous streams through conduits in which the gases are or have been in contact with solid particles. In many such processes it is desirable, for most effective operation, to determine the presence of solid particles in these streams. When a metal conduit or conduits are used for conveying gases, as is usually the case, and particularly in systems wherein the gases are not discharged at locations convenient for determination of entrained solids by visual inspection, it is particularly desirable to have available a satisfactory means for detecting the presence of such entrained solids.

An objective of this invention is to provide an improved system for detecting solids in gaseous streams. Another objective is to provide such a system capable of detecting solids at any convenient location in conduits carrying gaseous streams.

The invention is particularly adapted to contact processes, i. e., processes in which gases or vapors are contacted with solid contact materials such as catalysts or adsorbents in particulated form. Such processes are currently employed in the petroleum refining art, for example, in the conversion of hydrocarbons by catalytic means and the decolorization of lubricating oils and other hydrocarbon fractions wherein contact of same with particulated solid adsorbent material is effected. In such procedures the contact material becomes fouled during the conversion or adsorption step by carbonaceous deposits on the particles thereof and in the usual practice this deposit is burned off in a subsequent operation by contacting the particles with air under proper conditions prior to reuse of the contact material.

One specific and important application of this invention in connection with the petroleum refining industry is in the art of catalytic cracking. In the more modern of these catalytic cracking processes, the catalyst in solid particle form, which chemically is usually a metal oxide or a mixture of such metal oxides including oxide of silica, is continuously introduced into a reactor where it is contacted, while moving and under proper reaction conditions, with a stream of the hydrocarbons to be converted and is then passed through a regenerator or kiln where it is contacted with a stream of air to burn off the carbonaceous deposit formed on the catalyst particles during the conversion step. The thus reactivated catalyst is then transported from the kiln back to the reactor for reuse, and the process is run in such continuous manner for long periods of time. In other known catalytic cracking processes, the catalyst particles are not transported during contacting but remain as a fixed bed in vessels through which the hydrocarbon vapors are first passed for conversion and subsequently air is passed through the bed to reactivate or regenerate the catalyst for reuse.

Certain of the many conduits, through which gases pass to and from the reactors and regenerators of these catalytic cracking units, may carry particles of the catalyst suspended in the gaseous streams passing therethrough, particularly in such modifications wherein the catalyst is intentionally conveyed in gaseous media. Other gaseous streams desirably should not carry the catalyst particles.

It is a further objective of the present invention to provide a hydrocarbon conversion system in which the presence or absence of the contact particles in certain gaseous streams employed in the operation of such systems can be more readily detected.

The invention will be described in an important embodiment relating to a particular type of catalytic cracking process in its application to the detection of particles of catalyst in the flue gases resulting from regeneration of the catalyst. This particular process is of the well known moving catalyst type wherein a catalyst in granular particle size, as distinguished from powdered form, is conveyed as a moving bed through the reactor in contact with hydrocarbons and subsequently passed as a moving bed through a regenerator where it is contacted with air. In one form, the regenerator is made up of a plurality of superimposed, separate but connected kilns, each of which has its individual inlet for air and individual exhaust conduit for removing flue gas. This multi-stage kiln arrangement provides for closely controlled burning of the carbonaceous deposits. The moving bed of granular catalyst flows continuously from one kiln section directly to the next kiln section below it and so on to the catalyst exit of the regenerator and thence is transported for re-use to the reactor. The individual exhaust conduits from each kiln feed into a common manifold which conveys the flue gas through solids separators and then to the atmosphere.

During proper operation of the regenerator of such a unit, the flue gas leaving the regenerator may carry fines, i. e., powdery material which is unavoidably formed by attrition of the larger sized granular catalyst particles in passing through the system and in normal operation this powdery material is removed from the flue gas by the solids separators. However, removal from the regenerator of the larger, desired size granular particles by the gases passing therethrough is undesired and indicates faulty performance of one or more of the kiln sections. While removal from the regenerator of the granular catalyst particles by flue gas can be detected by visual examination of the material removed by the solids separators, this means is impractical and inconvenient, and of more importance, it does not indicate which of the several kilns of the series is losing the granular catalyst in the flue gas. Since, as indicated above, the exhaust conduit from each kiln connects with a manifold there has been to my knowledge no more practical means, prior to this invention, for determining which of these individual exhaust conduits carries the catalyst and hence which kiln or kilns is losing catalyst. Inasmuch as defective operation of any individual kiln often can be corrected without dismantling the remaining kilns, it is important that a means be devised to detect faulty operation of specific kilns and thus obviate more extensive dismantling of the regenerator. The present invention is intended to provide a solution to this problem. Such a multi-kiln regenerator, for use in connection with a reactor in a moving bed type of catalytic cracking system is illustrated in the accompanying drawings wherein;

Figure I shows partly in sectional form a side elevation of such a kiln;

Figure II, which is a side elevation, partly in sectional form, shows in enlarged form a flue gas exhaust conduit of such system carrying flue gas between a kiln section and the manifold and equipped with solids detecting means to be described. Figure II also is illustrative of a portable solids detection unit which may be inserted in or attached to any suitable conduit carrying gases for purposes of detecting solids conveyed by such gases.

The regenerator or kiln of Figure I comprises kiln sections as indicated generally at 1, 2, 3, 4, and 5 which are superposed on one another in inter-connecting relationship, in manner known to those skilled in the catalytic cracking art. Numeral 6 indicates a conduit for conveying catalyst to be regenerated from a reactor (not shown) to the top of the regenerator and 7 is a conduit for conveying regenerated catalyst from the bottom of the regenerator to the top of the reactor in known manner. The cut-away portion of Figure I shows the conventional catalyst distributing tubes, vapor separation zone and cooling zone of one of the kiln sections. Cooling tubes are shown at 8. Air is conveyed to the regenerator through manifold 9 which connects with manifold conduits 10, 11, 12, 13, and 14, connecting in turn to kiln sections 1, 2, 3, 4 and 5, respectively. The air to individual kiln sections is regulated by valves (not shown) on each manifold conduit.

The exhaust system of the regenerator comprises exhaust manifold 15, solids-separator shown diagrammatically at 16 and exhaust conduits 17 connecting kiln sections 1, 2, 3, 4 and 5 individually with header 15. In accordance with one embodiment of this invention, each of the exhaust conduits 17 is drilled to receive an electrical microphonic element 18 which extends into said conduit and which is slideably or rigidly fastened as desired therein by gasket 20 (Figure II). Gasket 20 is preferably constructed of a sound-deadening, fire-resistant material such as asbestos. Each of the microphonic elements 18 is connected electrically as by wires 21 to a selector switch 25 which in turn is connected electrically to an electronic amplifier unit 22. The amplifier unit 22 is connected electrically as by wires 23 to a receiver 24, which may be a device for converting electrical impulses to audible sound, such as a telephone receiving unit, or earphones, or an instrument for indicating visually the electrical responses received from the amplifier.

Certain portions and elements of the catalytic cracking system normally used with the illustrated regenerator have been omitted from the drawings for reasons of simplicity of presentation and because they need not be included here for an understanding of the present invention. For example, means for conveying the catalyst to and from the reactor and regenerator which may be a continuous bucket type elevator or a gas lift arrangement, as well as various valves, pumps and control devices, have not been shown. The detailed structure of such apparatus is well known to those skilled in petroleum refining. Likewise, the general operation of the illustrated catalyst regenerator and the moving bed catalytic cracking unit with which it is adapted for use, as concerns the flow of catalyst, air and flue gases has been described generally hereinabove and such description is believed adequate for an understanding of this invention.

By way of more specific description of this invention and of the embodiment here illustrated, the microphonic unit 18 preferably is of the known type capable of receiving sound impulses and converting them to electrical impulses. The amplifier unit 22 receives these electrical impulses and amplifies them to a degree such that they are converted to audible sound or other mechanical energy detectable by receiver. Preferably the amplifier is of the well known ionic tube type and equipped for variable volume control. The selector switch 25 may be of any suitable known design adapted to connect individually and successively the microphonic elements 18 to the amplifier 22.

Referring specifically to Figure II of the drawings for further description of operation, when none of the granular particles are being carried through an exhaust conduit 17 by the flue gas from the kiln section to which it is connected, the sensitive microphonic element 18 will pick up, and the receiver will detect only the continuous underlying noise incident to normal operation of the cracking unit. However, should particles 19 of the granular catalyst be removed from such kiln section by flue gas passing through its exhaust conduit 17, as would be the case during faulty operation of that particular kiln section, some of such particles will impinge upon corresponding microphonic element 18. With amplifier unit 22 suitably energized and the selector switch at proper setting, the impingement of the granular particles on element 18 will be indicated by receiver 24. When using a telephonic receiver unit as the receiver sharp pings or clicks, which are readily distinguishable from the stated underlying noise, will be emitted by the receiver. With proper adjustment of the sensitivity of the solids detection apparatus it is readily possible to detect the presence of granular catalyst in gaseous streams which also carry the smaller sized powdered catalyst particles formed by attrition.

By suitable successive settings of the selector switch 25 (Figure I) the amplifier and receiver circuit can be connected to any individual microphonic element 18 at will, so that exploratory tests of the granular catalyst content of the flue gases in each of the exhaust conduits 17 can be made individually and successively in a relatively short time. Thus those particular kiln sections which are operating in defective manner as to loss of granular catalyst in flue gas can be readily determined and this condition corrected by proper means without resort to a more extensive dismantling as would be necessary without the benefit of this invention.

More detailed descriptions of the construction and electrical circuits of the microphonic element, amplifier and receiver unit is not considered essential since such devices are known for other purposes. One such instrument, which combines the microphonic element, amplifier and receiver and which is adaptable for incorporation and use in this invention, is known as the "electronic sound probe." It will be understood that this instrument per se is not claimed as the present invention, but only in combination with other apparatus claimed.

Although the moving bed catalytic cracking units and other refining units and kilns to which this invention is applicable often extend many feet above ground, the various indicators and many of the controls of such units generally are situated at ground level in a control room. The embodiment of this invention here described and illustrated is adapted to such practice, i. e., there may be used a visual reading or recording receiver or indicator situated in the control room, so that a defective kiln section situated above ground level and which is losing catalyst via flue gas can be readily detected at control room location or other convenient location remote from the kiln and exhaust conduit.

Instead of the rod-shaped microphonic element shown, elements of different configuration may be used. For example, a sensitive element of screen or other open structure may be employed which will permit passage of gases but which will present a relatively large area for impingement of catalyst particles thereon as compared to a single rod-shaped microphonic element.

While the invention has been described herein in its application in catalytic cracking it should be understood that broader concepts are contemplated, as use in other processes employing streams of gases in association with solid contact material, as a means for determining solids conveyed in such gaseous streams.

I claim:

1. Apparatus for contacting gases with particulated solids comprising a contacting zone, a conduit communicating with said contacting zone for conveying a gaseous stream therefrom, microphonic means associated with said conduit and extending into said gaseous stream and an electronic system connected electrically to said microphonic means comprising a receiver capable of converting electrical impulses from said microphonic means to mechanical impulses, whereby solid particles carried in said gaseous stream and impinging upon said microphonic means may be detected.

2. Apparatus for detecting solid particles in gaseous streams comprising, in combination, a tube section for engagement with a conduit carrying a gaseous stream, a sound sensitive element carried by said tube section and extending into said tube and receiver means connected to said sound sensitive element adapted to receive from and indicate sounds originating in said sound-sensitive element.

3. Apparatus for contacting gases with particulated solids comprising a contacting zone, a conduit communicating with said contacting zone for conveying a gaseous stream therefrom, microphonic means associated with said conduit and extending into said gaseous stream, a receiver capable of converting electrical impulses from said microphonic means to mechanical impulses and means for the transmission of said electrical impulses from the microphonic means to the receiver.

References Cited in the file of this patent
UNITED STATES PATENTS

| | | |
|---|---|---|
| 2,114,401 | Price | Apr. 19, 1938 |
| 2,235,928 | Hardinge | Mar. 25, 1941 |
| 2,427,078 | Tucker et al. | Sept. 9, 1947 |
| 2,561,763 | Waters et al. | July 24, 1951 |
| 2,659,881 | Bogot et al. | Nov. 17, 1953 |